Aug. 25, 1925.
A. PECOTA
1,550,841
GARDENING IMPLEMENT
Filed Oct. 15, 1924
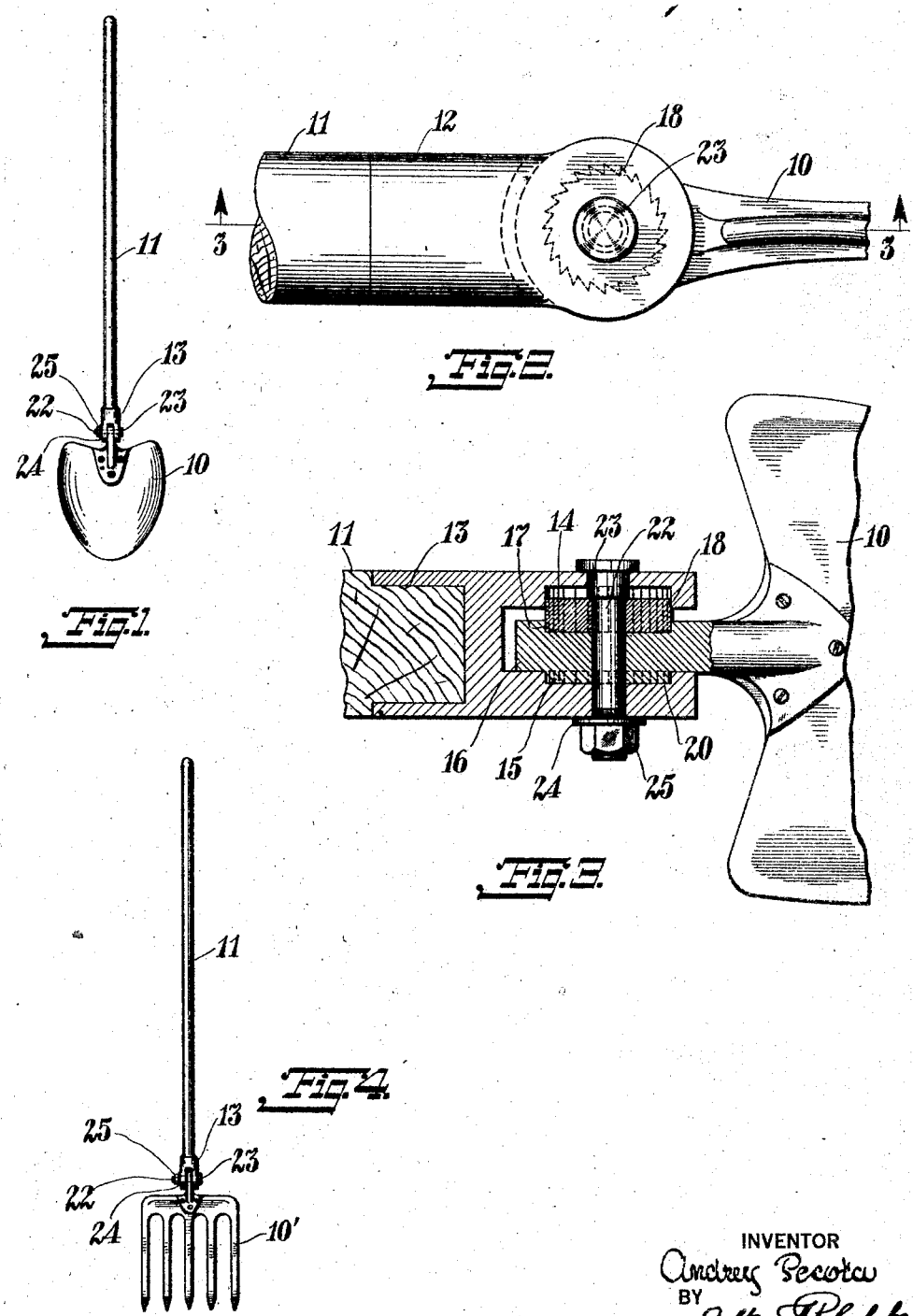
INVENTOR
Andrey Pecota
BY
Gottam Holachep
ATTORNEY Patented Aug. 25, 1925.

1,550,841

UNITED STATES PATENT OFFICE.

ANDREY PECOTA, OF REMSEN, NEW YORK.

GARDENING IMPLEMENT.

Application filed October 15, 1924. Serial No. 743,647.

*To all whom it may concern:*

Be it known that I, ANDREY PECOTA, a citizen of Russia, but having taken out first papers to be a citizen of the United States, residing at Remsen, in the county of Oneida and State of New York, have invented certain new and useful Improvements in Gardening Implements, of which the following is a specification.

This invention relates to implements such as spades, shovels, or the like that are used in gardening work or in various other lines of work, the invention having for an object the provision of a novel implement of this sort having a blade thereof adjustable with respect to the handle.

For further comprehension of the invention, and of the objects and advantages thereof, reference will be had to the following description and accompanying drawing, and to the appended claims in which the various novel features of the invention are more particularly set forth.

Fig. 1 of the drawing is a face view showing a shovel with the invention embodied therein.

Fig. 2 is an enlarged fragmentary face view showing the connecting joint between the blade and handle.

Fig. 3 is a longitudinal sectional view taken on the line 3—3 of Fig. 2.

Fig. 4 is a view similar to Fig. 1 but showing a different type of implement.

In the drawing the reference numeral 10 indicates an ordinary shovel blade, and 11 the handle thereof, this handle being connected to the blade by a novel joining device that permits of angular adjustment of the blade with respect to the handle. As here shown this joining device comprises a forked head 12 formed on its rear end with a socket 13 in which the forward end of the handle is fixed. Formed in the adjacent faces of the two forks of this head are star-shaped recesses 14 and 15 respectively, the former being deeper than the latter. Between the two forks of the head 12 engages an ear 16, that is formed integral with the blade 10, this ear being formed with flat faces and being of less thickness than the distance between the two forks of the head. This ear is formed on the side or face thereof adjacent the deeper recess 14 with a comparatively shallow recess 17 of similar shape to the recess 14. Carried partly in each recess 14 and 17 is a block 18 likewise of star shape and which is of a size to fit slidably in the said recesses. The opposite face of the ear 16 is formed with a shallow star-shaped projection 20 that engages freely in the recess 15.

The parts 12, 16, and 18 are formed with apertures that register with one another and have passed therethrough a locking or clamping bolt 22. This bolt has an enlarged neck that is accommodated in the aperture through that fork of the head that has the deeper recess 14 therein so that the shoulder formed at the end of this neck may bear on the block 18 when the bolt is clamped. A washer 24 and nut 25 are placed on the bolt 22 and by tightening the nut the parts are locked in position.

Assuming the parts locked together in the position shown in Fig. 3, and it is desired to change the angle of the blade with respect to the handle, the nut 25 is first loosened. The block 18 is then caused to move from the recess 17 in the ear 16 which is then moved transversely with the blade to free the projection 20 from the recess 15, and is then given, such angular movement as may be necessary to bring it into the desired position. The projection 20 is then re-engaged with the recess 15, and the block 18 re-engaged with the recess 17, in the ear 16, after which the nut 25 is tightened, thus locking the blade securely in its new position.

In Fig. 4 I have shown my invention applied to a spade having a forked blade 10', the parts being otherwise as above described.

Having thus described my invention, what I claim as new and desire to protect by Letters Patent of the United States is as follows:—

1. An implement of the type described comprising a handle formed with a forked head, the forks of said head having star-shaped recesses in their adjacent faces, a blade formed with a projecting ear that engages between the forks of the head, said ear having a star-shaped recess on one face thereof and a star-shaped projection on the other face thereof, said projection engaging in one of the recesses in the said forks of the head, a star-shaped block engaging partially in the other recess in the said forks and partially in the recess in the said ear, and a bolt engaged with said head and said block for binding the parts together.

2. An implement of the type described comprising a handle formed with a forked head, the forks of said head having star-shaped recesses in their adjacent faces, a blade formed with a projecting ear that engages between the forks of the head, said ear having a star-shaped recess on one face thereof and a star-shaped projection on the other face thereof, said projection engaging in one of the recesses in the said forks of the head, a star-shaped block engaging partially in the other recess in the said forks and partially in the recess in the said ear, and a bolt engaged with said head and said block for binding the parts together, said bolt having enlarged neck forming a shoulder that bears on the said block.

3. An implement of the type described comprising a handle formed with a forked head, the forks of said head having star-shaped recesses in their adjacent faces, a blade formed with a projecting ear that engages between the forks of the head, said ear having a star-shaped recess on one face thereof and a star-shaped projection on the other face thereof, said projection engaging in one of the recesses in the said forks of the head, a star-shaped block engaging partially in the other recess in the said forks and partially in the recess in the said ear, and a bolt engaged with said head and said block for binding the parts together, said bolt having an enlarged neck forming a shoulder that bears on the said block, the recess in the said head that receives the said block being deeper than the recess that receives the said projection, the space between the said forks being greater than the thickness of the said ear to permit of transverse movement of the latter to disengage the said projection from the last recess.

In testimony whereof I have affixed my signature.

ANDREY PECOTA.